Dec. 2, 1952     A. B. STEVENSON ET AL     2,620,015
WEB REINFORCING MACHINE
Filed April 13, 1948                                 5 Sheets-Sheet 1
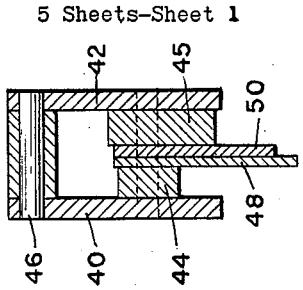
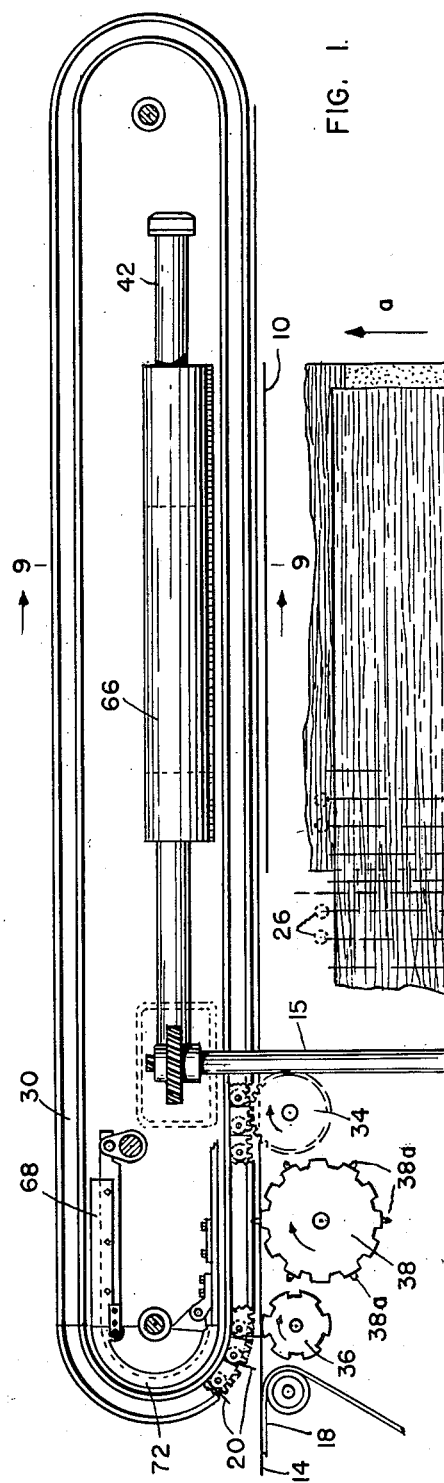
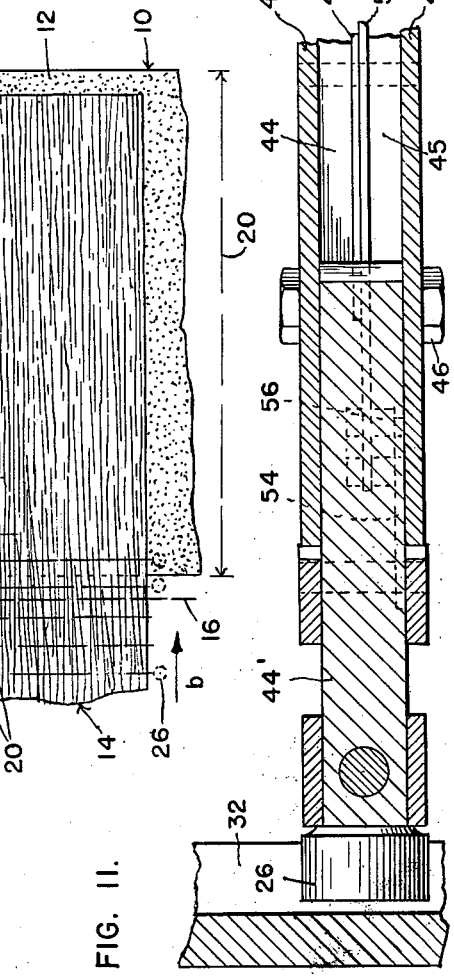
Inventors
ALLAN B. STEVENSON
WILLIAM H. CANNARD
Attorney

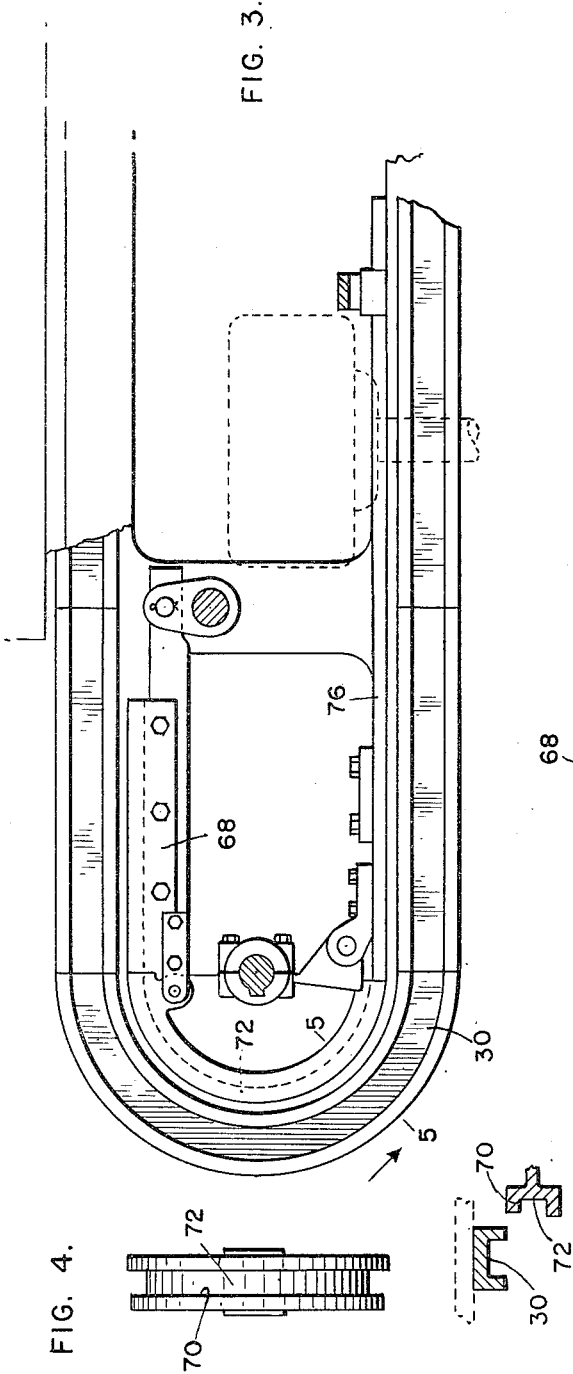

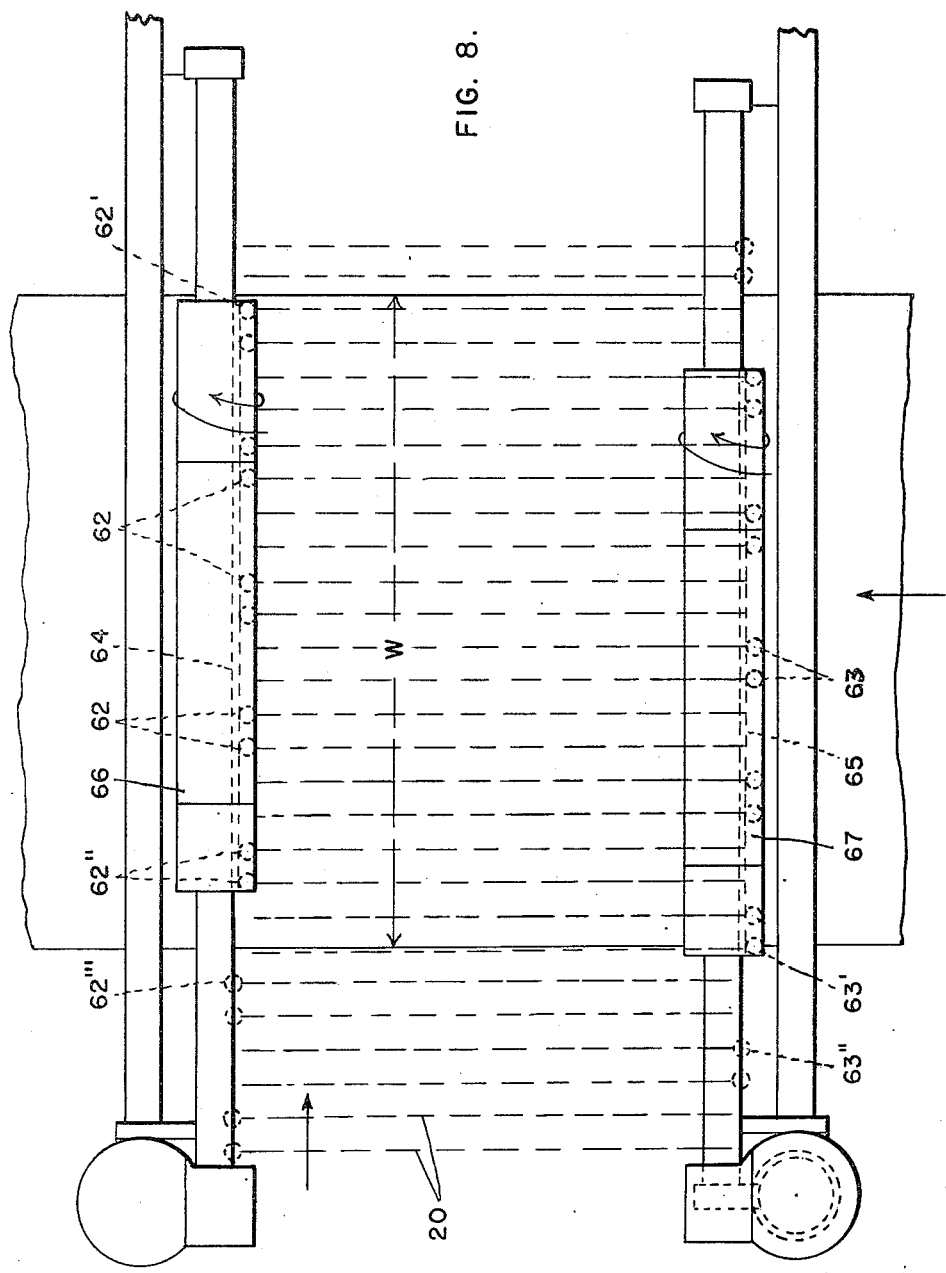

Dec. 2, 1952  A. B. STEVENSON ET AL  2,620,015
WEB REINFORCING MACHINE
Filed April 13, 1948 5 Sheets-Sheet 4
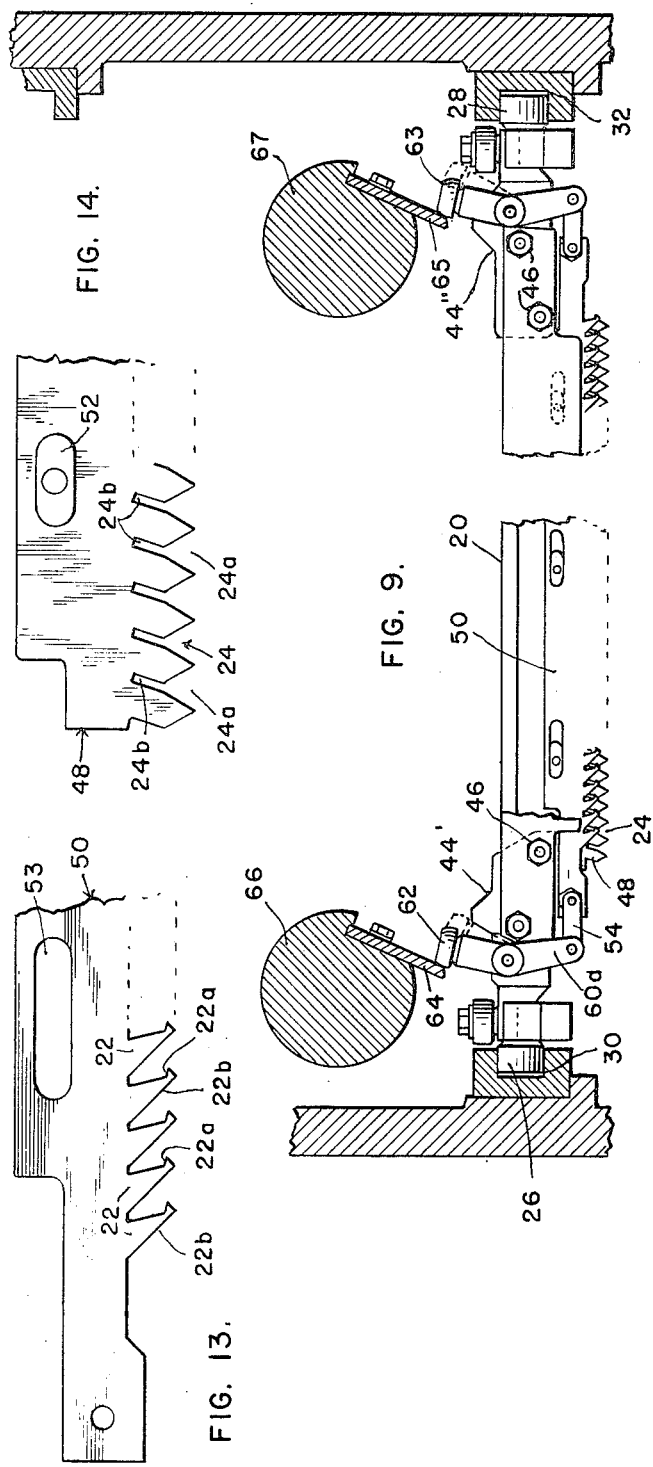
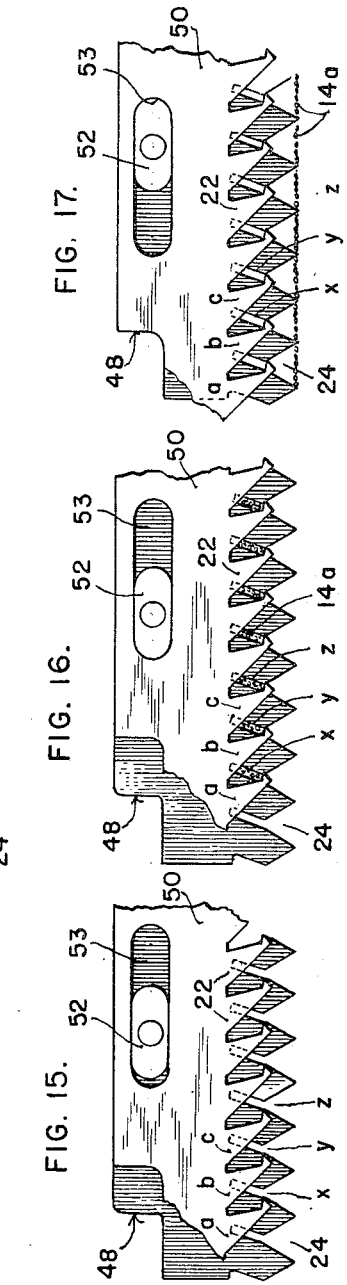
Inventors
ALLAN B. STEVENSON
WILLIAM H. CANNARD
Attorney

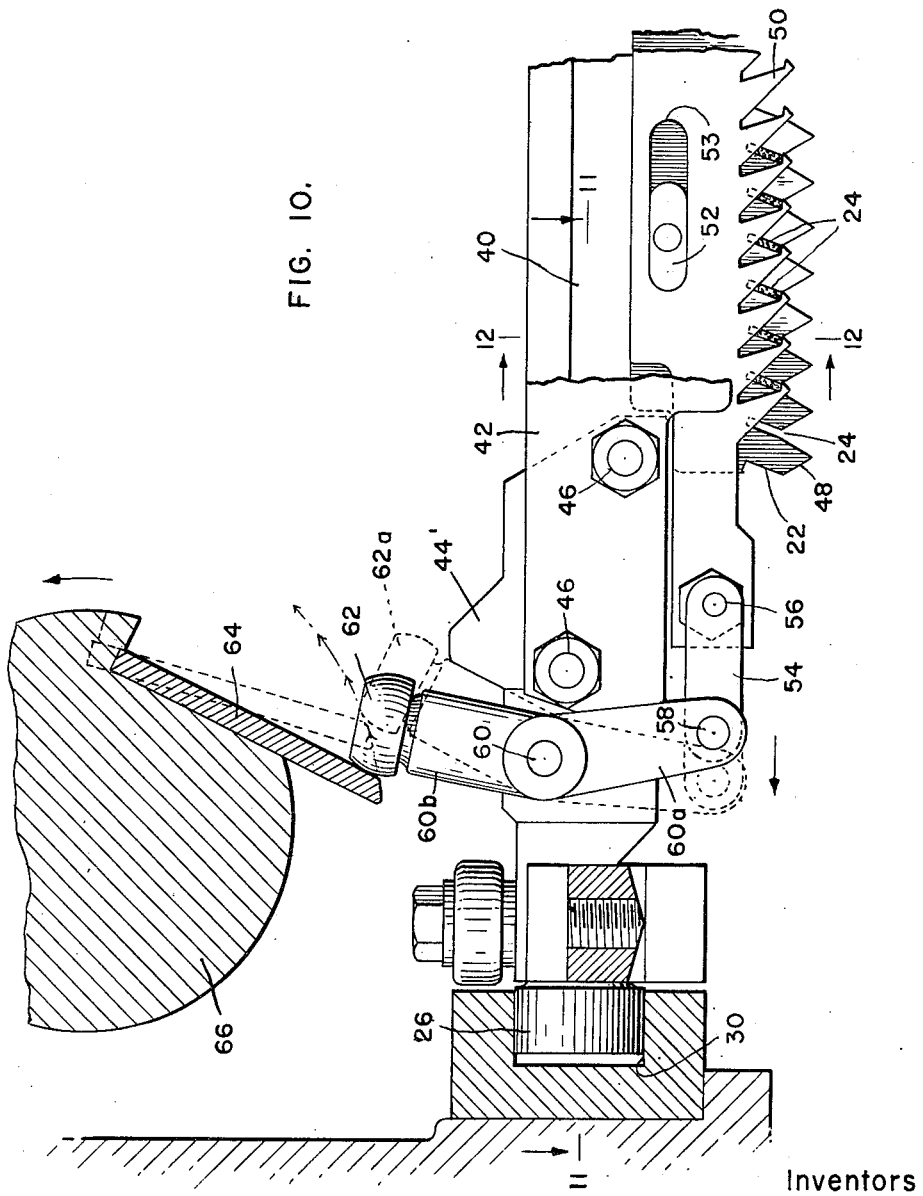

Patented Dec. 2, 1952

2,620,015

UNITED STATES PATENT OFFICE 2,620,015

WEB REINFORCING MACHINE

Allan B. Stevenson, North Attleboro, and William H. Cannard, Attleboro, Mass., assignors to American Reenforced Paper Company, Attleboro, Mass., a corporation of Massachusetts Application April 13, 1948, Serial No. 20,636

9 Claims. (Cl. 154—1.7)

This invention relates to apparatus for applying reenforcing fibers transversely of a web of paper or the like.

In machines of this character such, for example, as shown and described in the Gibbs Pat. No. 2,264,305, issued December 2, 1941, for "Method and Apparatus for Reinforcing Webs of Paper and the Like," the reenforcing fibers, in the form of a continuous sheet, advance with a continuous movement from a supply into the machine where they are grasped by carrier bars arranged in an endless series and moving continuously at the same speed as the fiber sheet to convey the fibers over the paper in a direction normal to the direction of advance of the paper. After a length of fiber equal to the width of the web has been cut from the fiber sheet, the carrier bars release and doff the cut lengths of fiber onto the web of paper advancing beneath it. This process is repeated at timed intervals to produce a continuous layer, lengthwise of the paper, of transversely disposed fibers.

It is the primary object of our invention to improve the construction and mode of operation of the carrier bars and the doffing mechanism which actuates the bars. By our improvements we have enabled the machine to operate at increased speed with reduced maintenance costs and to produce a superior and more uniform product.

In the drawings:

Fig. 1 is a side elevation view of the machine.

Fig. 2 is a diagrammatic plan view indicating the deposit of the fibers on the web.

Fig. 3 is an enlarged side elevation view of the machine at the fiber receiving end.

Fig. 4 is an end elevation view of the circular cam track.

Fig. 5 is a section of the cam track on the line 5—5 of Fig. 3.

Fig. 6 is a plan view of the resetting cam.

Fig. 7 is a detail plan of the locking cam.

Fig. 8 is a diagrammatic plan view showing the relative positions of the actuators on successive carrier bars.

Fig. 9 is a vertical section on the line 9—9 of Fig. 1.

Fig. 10 is an enlarged vertical section corresponding to Fig. 9 showing one end of a carrier bar and the companion doffing roll.

Fig. 11 is a horizontal section of one end of a carrier bar taken on the line 11—11 of Fig. 10.

Fig. 12 is a vertical section on the line 12—12 of Fig. 10.

Fig. 13 shows a portion of the locking and doffing plate.

Fig. 14 shows a portion of the comb plate.

Figs. 15, 16 and 17 show the plates of Figs. 13 and 14 juxtaposed and in the positions for receiving, locking and doffing the fibers respectively.

In accordance with our invention, a web 10 of paper or the like (Fig. 2) coated with asphalt or other adhesive 12 advances continuously through the machine in the direction indicated by the arrow $a$. Transverse reenforcing fiber 14 in the form of an attenuated sheet advances continuously through the machine in a direction normal to that of the paper as indicated by the arrow $b$. As a length of web 10 equal to the width of the fiber sheet 14 is advanced beneath the fiber sheet a length of fiber sheet 14 equal to the width of the web 20 is advanced across and above the web where it is cut from the sheet and doffed onto the web to provide a substantially continuous layer of tranverse fibers lengthwise of the moving web. 26 indicates the line along which the fiber sheet is cut as it approaches the position where it is doffed to the web.

The sheet of fibers 14, consisting of sisal fibers or other desired reenforcement, is introduced to the machine from the left as viewed in Figs. 1 and 2 over a feed apron 18 which delivers the fiber sheet to a series of carrier bars 20 (see also Fig. 2) extending parallel with each other across the fiber sheet. Each carrier bar is provided with a comb plate 48 (Fig. 9), to be referred to, having interdental slots 24 adapted to receive the fibers. The carrier bars are equally spaced part, arranged in endless series. Each carrier bar has a roller 26 at one end and a roller 28 at the other, which travel in opposite grooves 30 and 32 respectively. The grooves are continuous having straight upper and lower courses connected by semi-circular ends as indicated in Fig. 1. In these respects the machine may be constructed substantially like the machine of the Gibbs Pat. No. 2,264,305 and as there described in greater detail the carrier bars are driven by opposite gears 34 (Fig. 1) to advance them continuously; upon entering the machine the fibers are pressed into the slots 24 of the combs by the axially grooved locking roll 36; the fiber sheet is cut by selected knives 38$a$ of knife roll 38 at such predetermined intervals as will produce cut lengths of fiber sheet equal to the width of web being processed which may vary as that patent describes.

Our invention relates to the construction of the carrier bars and the mechanism for actuating them.

Referring to Figs. 9 to 12 inclusive, each bar has side plates 40, 42 secured together in proper spaced relation to each other by end blocks 44' and 44" to which the plates are bolted as shown at 46. Suitably supported between the side plates and spaced therefrom as by the spacer blocks 44 and 45 (Fig. 12) are two plates 48 and 50 juxtaposed and relatively slideable in the direction of their lengths, the plate 48 preferably being fixed and the plate 50 slideable relative thereto. The plate 48 (Fig. 14) has the interdental slots 24 above referred to which receive the fiber. The plate 50 is a locking and doffing plate having teeth 22 (Fig. 13) functioning selectively to lock the fibers in the slots 24 or to doff them therefrom. The plate 50 is guided in its sliding movement lengthwise of the plate 48 by the oval bosses 52 suitably secured to and protruding from the side of the plate 48, the bosses working in elongated slots 53 in the sliding plate 50. Such lengthwise sliding movement is imparted to the plate 50 by mechanism including link 54 (Fig. 10) pivoted at 56 to the end of the plate and at 58 to one arm of a bell crank pivoted to the block 44' at 60. The other arm of the bell crank carries a roller 62, or actuator, which at times is engaged by the blade 64 of a doffing roll 66, rotating counterclockwise as viewed in Fig. 10, to move the actuator 62 from its full to its dotted line position 62a. Position 62, which we refer to as retracted, is assumed to lock the fibers in the slots 24 as will be described with reference to Fig. 16 and position 62a, which we refer to as advanced, is assumed when the fibers are doffed from the slots as will be described with reference to Fig. 17. The plate 50 has a position intermediate these two extremes to open the slots 24 for reception of the fibers therein, as indicated in Fig. 15, which is effected by a resetting cam 68 (Figs. 1 and 6) which the actuators engage as they approach the semi-circular course at the fiber receiving end of the machine. This cam has an actuator engaging cam surface 68a which moves the plate 50 to the position shown in Fig. 15 wherein slots 24 are open and unobstructed at their lower ends by the teeth 22 of plate 50 so they may receive the fibers. Plate 50 is held in this position as the carrier bars travel around the semi-circular end course, the actuators 62 at that time being restrained by the side walls 70 of groove 72 (Fig. 4) until the locking roll 36 (Fig. 1) is reached when the fibers are pressed by the roll into the comb slots. Immediately thereafter the plate 48 is shifted to the fig. 16 position to lock the fibers 14a (Fig. 16) in the slots, for which purpose the actuators 62 are engaged by camming surface 74 of a locking cam 76. The carrier bars then travel to the position over the paper 10 (Fig. 1) where, at the proper time, knife roll 38 operates to cut the fiber along line 16 (Fig. 2) and thereafter doffing blade 64 (Fig. 10) engages and wipes actuators 62 into their 62a positions to doff the cut fibers to the web.

As shown in detail in Fig. 14, each slot 24 has a widened mouth 24a, to facilitate reception of the fibers, leading into a narrowed throat portion 24b into which the fibers are forced by the locking roll 36. The throat portions 24b of the slots 24 and the teeth 22 of plate 50 (Fig. 13) are inclined in opposite directions. The teeth 22 have lower extremities 22a which are at times juxtaposed opposite the lower ends of the throat portions 24b of the slots (Fig. 16) to retain the fibers 14a in the slots for which purpose those extremities are preferably substantially normal to the inclination of the fiber-receiving slot portions 24b. Each of the teeth 22 also has a doffing edge 22b which is disposed at the base of a slot when the fibers are locked in the slot by the next adjacent tooth and which, by its inclination relative to that of the slot 24 has an effective motion downwardly of the slot when plate 50 is moved to the left, thus ejecting the fibers from the slot. The extent of this movement of plate 50 is indicated by a comparison of the positions of boss 52 and slot 53 in Figs. 16 and 17. In Fig. 16, teeth $a$, $b$, and $c$ are in position to lock fibers 14a in the slots $x$, $y$, and $z$ respectively. When plate 50 moves to its Fig. 17 position, tooth $b$ has ejected the fibers from slot $x$, tooth $c$ has ejected the fibers from slot $y$, and so on.

To effect such ejecting movement of the plate 50 by oscillation of the actuators 62 from their retracted full line position (Fig. 10) to their advanced dotted line position 62a is the function of the blade 64. When the blade, in moving counterclockwise, initially engages the actuator, as shown in full lines, the point of contact of actuator and blade is near the lower end of the blade with only enough of the blade extending down behind the actuator to insure good working contact. The bell crank of the actuator is so positioned and its arm 60b is so inclined and of such length that as the blade and actuator move from their full to their dotted line positions, the point of contact between them moves down the blade until the extreme advanced position, shown in dotted lines, is reached when the actuator moves out of the path of the blade, permitting the blade to move on counterclockwise. Contributing to this mode of operation is the inclination at which the blade is mounted so that during this movement, the blade has a substantial upward component of movement as compared with its outward component urging the actuator to dotted line position. Thus the arcs of movement of the blade and actuator intersect and then quickly diverge so that the doffing roll need not be brought to rest when the actuators reach their advanced position and in this way we provide for continuous movement of the doffing roll.

There are two doffing rolls on opposite sides of the machine as shown in Figs. 8 and 9 at 66 and 67—each with a blade 64 and 65 respectively. The actuators for some of the carrier bars are at one side of the machine, operated by blade 64, and for others at the other side, operated by blade 65. Two successive carrier bars are shown in Fig. 9, one having an actuator 62, by which numeral we designate all actuators on the left side of the machine, and the other has its actuator 63. Whether actuated left or right handed the slots in the carrier bars are inclined in the same direction (upwardly to the right as viewed in Fig. 9) and the teeth of plate 50 are inclined in the opposite direction. Also in each instance the plate 50 moves to the left to doff and the actuators are moved clockwise to their advanced positions so that both of the rolls 66 and 67 rotate counterclockwise.

The length of each doffing blade 64, 65 is determined by the number of actuators engaged during each cycle of operation which, in turn, is determined by the width of paper being treated and hence the number of carrier bars needed for the required length of reenforcing fiber. As indicated in Fig. 8, the doffing rolls and blades are made in sections for adjustable length to conform to different paper widths.

The blades 64 and 65 are shown in Fig. 8, in their advanced positions corresponding to the dotted line position of Fig. 10. The blades have engaged and moved into advanced positions the opposite series of actuators 62 and 63 for a width of paper indicated at W. The extreme actuators which have thus been engaged by the blades are actuator 63' on one side of the machine, engaged by blade 65, and actuator 62' diagonally opposite the actuator 63' engaged by the blade 64. The carrier bars and their actuators are moving continuously in the direction indicated by the arrow and the doffing rolls are rotating continuously in the direction also indicated by arrows. As the blade 65 engaged the actuators 63, including actuator 63', and moved through the path of travel of the oncoming actuators on that side, there was a space equal to the width of two carrier bars separating the actuator 63' and the next succeeding actuator 63, designated at 63''. By thus affording a substantial space between the actuators 63' and 63'', we assure that blade 65 may perform its actuating function, moving through the path of the advancing actuators, with no danger of being struck by the next succeeding actuator 63''. The actuators for the carrier bars intermediate those bars carrying the actuators 63' and 63'' are on the opposite side of the machine and a similar spacing for the same purpose is provided between the two consecutive actuators 62'' and 62'''. Thereby our machine contributes further to the desired continuity of movement of the doffing roll.

We claim:

1. In a web reenforcing machine, the combination of a series of continuously traveling carrier bars each having a pair of juxtaposed plates relatively moveable in the direction of their lengths, one of the plates being formed with inclined fiber receiving slots, the other plate having spaced teeth the extremities of which are superimposed over the exit ends of the slots when the plates are moved relatively in one direction to retracted position to lock the fibers in the slots, the teeth having surfaces extending at an inclination opposite to that of said slots and crossing the slots adjacent their bases so that said surfaces eject the fibers from the slots upon relative movement of the plates in the opposite direction to advanced position, an actuator protruding from and traveling with each bar and connected to one of said plates to effect such relative movements when the actuator is moved to retracted and advanced positions, respectively, a blade rotatably mounted to rotate in an arc which intersects the path of travel of the actuators, in retracted position, so that the blade engages and moves the actuators toward advanced position, the actuators being pivotally mounted to swing out of said arc when moved by the blade to advanced position whereby the blade may pass the actuators and move on without stopping, and means for rotating said blade continuously.

2. In a web reenforcing machine, the combination of an endless series of parallel, continuously traveling carrier bars, each having fiber receiving, locking and doffing elements and an actuator, traveling with the bar, associated with said elements and moveable from a retracted to an advanced position to actuate the elements, the actuators of selected groups of the bars protruding from those bars in alignment with each other, when in retracted positions, along a predetermined line, the actuators of the remaining bars protruding therefrom in alignment with each other, when in retracted positions, along a line spaced from and parallel with the first line, a blade disposed adjacent each of said lines and moveable in an arcuate path through its said line to engage and move the actuators in said line from retracted to advanced positions, each of said blades being of a length to span and engage simultaneously a substantial number of said actuators, the actuators in alignment along each line being arranged in successive groups spaced from each other by predetermined distances to enable the blade to swing through the said line in moving the actuators engaged by it out of said line from retracted to advanced positions without being struck by oncoming actuators disposed in retracted positions along the said line, and means for continuously advancing both of said blades.

3. In a web reenforcing machine, the combination of an endless series of parallel, continuously traveling carrier bars, each having fiber receiving, locking and doffing elements and an actuator, traveling with the bar, associated with said elements and moveable from a retracted to an advanced position to actuate the elements, the actuators of selected groups of the bars protruding from those bars in alignment with each other, when in retracted positions, along a predetermined line, the actuators of the remaining bars protruding therefrom in alignment with each other, when in retracted positions, along a line spaced from and parallel with the first line, a blade disposed adjacent each of said lines and moveable in an arcuate path through its said line to engage and move the actuators in said line from retracted to advanced positions, each of said blades being of a length to span and engage simultaneously a substantial number of said actuators, the actuators in alignment along each line being arranged in successive groups spaced from each other by predetermined distances and with the groups of actuators in one line alternating with those in the other line, the said spaces enabling the blade to swing through the said line in moving the actuators engaged by it out of said line from retracted to advanced positions without being struck by oncoming actuators disposed in retracted positions along the said line, and means for continuously advancing both of said blades.

4. In a web reenforcing machine the combination of a series of continuously traveling carrier bars each having fiber receiving, locking and doffing elements and an actuator, traveling with the bar, associated with said elements and moveable from a retracted to an advanced position to actuate the elements, a blade extending parallel with the path of travel of the actuators, in retracted positions, the said blade being rotatably mounted to rotate in an arc which intersects said path of movement of the actuators in retracted positions so that the blade engages and moves the actuators toward advanced positions, the actuators being pivotally mounted to swing in an arc, when moving toward advanced positions, which intersects the arc of movement of the blade and then quickly diverges therefrom so that the blade may wipe the actuators into advanced positions and move on without stopping, and means for rotating the blade continuously.

5. As elements in a web reenforcing machine, a fiber carrying and doffing bar having a pair of juxtaposed plates relatively moveable in the direction of their lengths, one of the plates being formed with fiber receiving slots extending at an inclination to the vertical, the other plate having spaced teeth, the extremities of which are superimposed over the exit ends of the slots, when the plates are moved relatively in one direction, to lock the fibers in the slots, the teeth having surfaces extending at an inclination opposite to that of said slots and crossing the slots adjacent their bases so that said surfaces have an effective movement outwardly of the slots to eject the fibers from the slots upon relative movement of the plates in the opposite direction.

6. As elements in a web reenforcing machine, a fiber carrying and doffing bar having a pair of juxtaposed plates relatively moveable in the direction of their lengths, one of the plates being formed with fiber receiving slots extending parallel with each other and at an inclination to the vertical, the other plate having spaced teeth, each tooth extending at an inclination opposite to that of the slots and being of a length to span two adjacent slots with the outer end of one edge of each tooth juxtaposed over the outer end of a slot to lock the fibers in the slot, and with the inner end of the opposite edge of each tooth disposed adjacent the inner end of the next adjacent slot, so that when the plates are thereafter relatively moved the slots are unlocked and the said inclined edges have an effective movement outwardly of the slots to doff the fibers from the slots.

7. In a web reenforcing machine, the combination of a series of continuously traveling carrier bars each having a plurality of relatively movable juxtaposed plates adapted selectively to receive and hold fibers and alternatively to doff fibers to the web, an actuator protruding from and traveling with each bar and associated with the plates to effect such relative movements when the actuator is moved between retracted and advanced positions, a blade rotatably mounted to rotate in an arc which intersects the path of travel of the actuators in retracted position so that the blade engages and moves the actuators toward advanced position, the actuators, in retracted position, and the blade being so mounted and relatively positioned that the area of contact between actuator and blade is near the lower end of the blade and moves down the blade until the advanced position of the actuator is reached when the actuator is moved out of the path of the blade permitting the blade to move on continuously, and means for rotating the blade continuously.

8. As elements in a web reenforcing machine, a fiber carrying and doffing bar having a pair of juxtaposed plates relatively movable in the direction of their lengths, one of the plates being formed with fiber receiving slots, extending in a predetermined direction, the other plate having spaced teeth, each tooth, when the plates are in predetermined position, having a surface extending across a slot near the base of the slot and at an inclination to the direction of the slot so that relative movement of the plates from that position imparts an effective movement of the said surfaces outwardly of the slots to doff the fibers from the slots.

9. As elements in a web reenforcing machine, a fiber carrying and doffing bar having a pair of juxtaposed plates relatively movable in the direction of their lengths, one of the plates being formed with fiber receiving slots extending in a predetermined direction and the other plate having spaced teeth, each tooth extending at an inclination to the direction of the slots with its outer end juxtaposed over the end of a slot to lock the fibers in the slot when the plates are in predetermined position, each tooth, when the plates are in that position, having a side edge extending across a slot near the base of the slot and at an inclination to the direction of the slot so that relative movement of the plates from that position imparts an effective movement to the teeth edges outwardly of the slots to doff the fibers from the slots.

ALLAN B. STEVENSON.
WILLIAM H. CANNARD.

REFERENCES CITED

The following references are of record in the file of this patent:

UNITED STATES PATENTS

| Number | Name | Date |
|---|---|---|
| 1,211,850 | Howard | Jan. 9, 1917 |
| 1,590,167 | Howard | June 22, 1926 |
| 1,841,945 | Gibbs | Jan. 19, 1932 |
| 2,264,305 | Gibbs | Dec. 2, 1941 |